Patented Aug. 3, 1926.

1,594,697

UNITED STATES PATENT OFFICE.

OSKAR SPENGLER, OF DESSAU ANHEIM, AND WERNER MÜLLER, OF LEIPZIG, GERMANY, ASSIGNORS TO ACTIEN GESELLSCHAFT FÜR ANILIN FABRIKATION, OF BERLIN, GERMANY.

MANUFACTURE OF SULPHOCYANO DERIVATIVES.

No Drawing. Application filed September 2, 1925, Serial No. 54,131, and in Germany September 24, 1924.

Free thiocyanogen has been prepared by the action of iodine, bromine or chlorine upon the sulphocyanide of lead, mercury or silver. with the exception that the action of chlorine on lead has not so far proved to be a method of obtaining the free thiocyanogen.

According to the present invention, the reaction in a suitable solvent between a halide of sulphuric acid and a sulphocyanide, for example lead sulphocyanide, produces a solution which contains a compound which easily decomposes into thiocyanogen and sulphurous acid. One can assume the production of a sulphuryl sulphocyanide as an intermediate stage in the reaction between a sulphocyanide and sulphuryl chloride for example. Solutions produced in this manner are suitable for introducing the sulphocyanogen residue into organic compounds, by causing the solution to react with them for instance with an hydroxaryl compound.

The following examples illustrate the invention without limiting it, the parts being by weight:

*Example 1.*—13.5 parts of sulphurylchloride are dissolved in 400 parts of carbontetrachloride and an excess of finely powdered leadsulphocyanide is introduced. A lively reaction sets in at once and after some time the reaction is completed. The leadchloride and excess of sulphocyanide are separated by filtration and the filtrate is mixed with a cold solution of 14.5 parts of 1-hydroxynaphthalene in carbontetrachloride.

A lively evolution of hydrogensulphocyanide ensues while the liquid becomes turbid and there separates gradually from it a brownish crystalline mass which after further purification proves to be 4-sulphocyano-1-hydroxynaphthalene of melting point 111–112° C. A sample of it mixed with a compound obtained by Kaufmann (Berichte der Deutschen Pharmazeutischen Gesellschaft 33, page 144) did not show a lower melting point.

It is obvious to those skilled in the art that our present invention is not limited to the foregoing example or to the details given therein. It may be stated, for instance, that instead of the 1-hydroxynaphthalene employed in the foregoing example any hydroxyaryl compound may be used. It is obvious that in employing such other hydroxyaryl compound the proportions of the ingredients as well as the other special conditions of reaction may be altered in order to obtain the best results.

What we claim is,—

The hereindescribed manufacture of sulphocyano-derivatives by causing a solution containing a product of the reaction between a halide of sulphuric acid and a sulphocyanide to react with aromatic hydroxyaryl compounds.

In testimony whereof we affix our signatures.

OSKAR SPENGLER.
WERNER MÜLLER.